(12) United States Patent
Miller

(10) Patent No.: US 9,303,820 B2
(45) Date of Patent: Apr. 5, 2016

(54) CHEMILUMINESCENT AEROSOL SPRAY

(76) Inventor: Harris Richard Miller, Sharon, MA (US)

( * ) Notice: Subject to any disclaimer, the term of this patent is extended or adjusted under 35 U.S.C. 154(b) by 1143 days.

(21) Appl. No.: 13/315,442

(22) Filed: Dec. 9, 2011

(65) Prior Publication Data

US 2012/0076930 A1    Mar. 29, 2012

Related U.S. Application Data

(63) Continuation-in-part of application No. 12/287,653, filed on Oct. 14, 2008, now abandoned.

(60) Provisional application No. 61/431,037, filed on Jan. 9, 2011.

(51) Int. Cl.
| | |
|---|---|
| *F21K 2/06* | (2006.01) |
| *B05B 7/04* | (2006.01) |
| *B05B 7/24* | (2006.01) |
| *B05B 11/00* | (2006.01) |

(Continued)

(52) U.S. Cl.
CPC .............. *F21K 2/06* (2013.01); *B05B 7/0408* (2013.01); *B05B 7/2472* (2013.01); *B05B 11/3084* (2013.01); *B65D 83/38* (2013.01); *B65D 83/62* (2013.01); *B65D 83/687* (2013.01); *B65D 83/32* (2013.01)

(58) Field of Classification Search
CPC ..... F21K 2/06; B05B 11/3084; B05B 7/0408; B05B 7/2472; B65D 83/687; B65D 83/62; B65D 83/32; C09K 11/07
USPC ........................................................ 252/700
See application file for complete search history.

(56) References Cited

U.S. PATENT DOCUMENTS

| | | |
|---|---|---|
| 2,977,320 A | 1/1957 | Jenkins |
| 3,236,418 A | 2/1966 | Dalle et al. |

(Continued)

FOREIGN PATENT DOCUMENTS

| | | |
|---|---|---|
| EP | 0489219 A1 | 6/1992 |
| JP | 03236101 A | 10/1991 |

(Continued)

OTHER PUBLICATIONS

European Patent Office Coomunication dated Aug. 23, 2013 (Notice of Allowability) for EP 09820864.8.

(Continued)

*Primary Examiner* — Daniel S Metzmaier
(74) *Attorney, Agent, or Firm* — Leon Fortin, Jr.

(57) ABSTRACT

This invention relates to a stable, highly visible, multiple use, chemiluminescent composition of matter and aerosol system capable of articulating, communicating, displaying or marking, night-time chemiluminescent messages, in the form of written text, numerics, alpha-numerics, figures, drawings, emergency messages, trail markings, lanterns or distress calls, directly onto various substrates and surfaces, including dark or non-reflective objects and outdoor natural surfaces such as grass, trees or land. The invention functions by co-dispensing two vessels, each of which is pressurized by means of a non-flammable liquid or gaseous propellant. The chemical ingredients from each vessel are combined upon contact with the surface or by means of a mixing valve or upon attached to the actuators of each vessel, which simultaneously eject the contents of both vessels and produce a chemiluminescent aerosol spray.

17 Claims, 4 Drawing Sheets

(51) Int. Cl.
   *B65D 83/38* (2006.01)
   *B65D 83/62* (2006.01)
   *B65D 83/68* (2006.01)
   *C09K 11/07* (2006.01)
   *B65D 83/32* (2006.01)

(56) References Cited

U.S. PATENT DOCUMENTS

| | | | |
|---|---|---|---|
| 3,451,593 | A | 6/1969 | Dillarstone |
| 3,494,871 | A | 2/1970 | Clapp et al. |
| 3,511,612 | A | 5/1970 | Kennerly et al. |
| 3,584,211 | A | 6/1971 | Rauhut |
| 3,597,362 | A | 8/1971 | Bollyky et al. |
| 3,612,857 | A | 10/1971 | Beatty et al. |
| 3,697,434 | A | 10/1972 | Shefler |
| 3,744,718 | A | 7/1973 | Morley |
| 3,749,679 | A * | 7/1973 | Rauhut ............... C09K 11/07 252/700 |
| 3,940,605 | A | 2/1976 | Gerber |
| 4,678,608 | A | 7/1987 | Dugliss |
| 4,682,544 | A | 7/1987 | Koroscil et al. |
| 5,889,362 | A | 3/1999 | Barten |
| 6,103,534 | A | 8/2000 | Stenger et al. |
| 6,736,288 | B1 | 5/2004 | Green |
| 6,877,924 | B1 | 4/2005 | Mears et al. |
| 7,021,499 | B2 | 4/2006 | Hansen et al. |
| 7,052,631 | B2 | 5/2006 | Cranor |
| 7,222,752 | B2 | 5/2007 | Ponton |
| 2002/0004942 | A1 * | 1/2002 | Bryan ............... A23G 3/366 800/288 |
| 2004/0251275 | A1 | 12/2004 | Sams et al. |
| 2005/0180126 | A1 | 8/2005 | Steinberg |
| 2005/0224768 | A1 | 10/2005 | Park et al. |
| 2010/0091478 | A1 | 4/2010 | Miller |

FOREIGN PATENT DOCUMENTS

| | | |
|---|---|---|
| JP | 03253400 A | 11/1991 |
| WO | 2010044815 A1 | 4/2010 |

OTHER PUBLICATIONS

International Search Report dated Sep. 24, 2009 for PCT/US09/04485.
Supplementary European Search Report dated Jun. 5, 2012 for EP09820864.

* cited by examiner

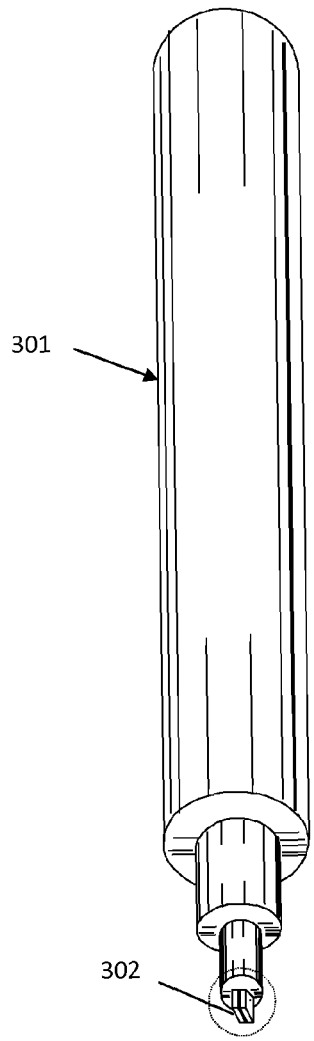
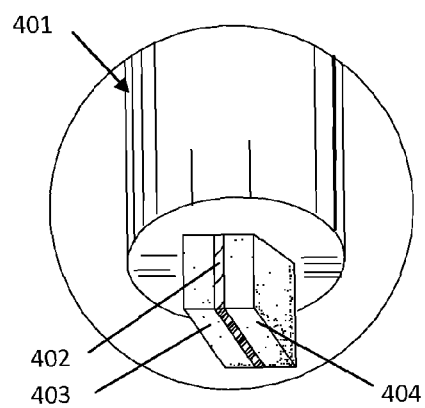
FIG. 4A
FIG. 5B
FIG. 4
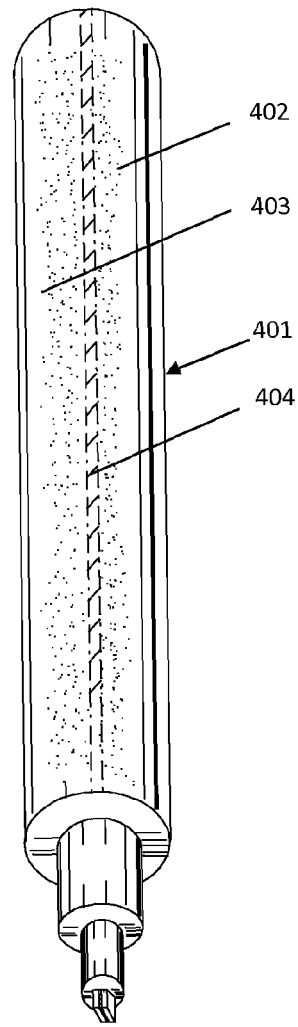
FIG. 5

CHEMILUMINESCENT AEROSOL SPRAY

CROSS REFERENCE TO RELATED APPLICATIONS

This application is a continuation-in-part application of pending U.S. application Ser. No. 12/287,653 filed on Oct. 14, 2008, now abandoned and claims the benefit of and takes priority from U.S. Provisional Application No. 61/431,037 filed on Jan. 9, 2011, the contents of which are herein incorporated by reference.

BACKGROUND OF THE INVENTION

1. Field of the Invention

This invention relates to a stable, highly visible, multiple use, chemiluminescent composition of matter and aerosol system capable of articulating, communicating, displaying or marking, night-time chemiluminescent messages, in the form of written text, numerics, alpha-numerics, figures, drawings, emergency messages, trail markings, lanterns or distress calls, directly onto various substrates and surfaces, including dark or non-reflective objects and outdoor natural surfaces such as grass, trees or land.

2. Brief Description of Art

Chemiluminescence is a well-known and established phenomenon, dating back as far as 1928 with the discovery of 3-aminophthalhydrazide, a.k.a. Luminol (U.S. Pat. No. 3,597,362). Similar to chemiluminescence, bioluminescence is ubiquitous in nature and can be found in a wide variety of algae and insects. The many uses of chemiluminescence and bioluminescence are widespread and span from applications of biological identification to general illumination. A A commercial example of modern-day chemiluminescence is a small, flexible tubular housing comprised of two liquids in two separate compartments. Light energy is generated when the first, inner compartment is fractured, which mixes the contents with the second, outer compartment. Such a device, known as a "light-stick", has found widespread use in many emergency, military and even novelty applications.

Notwithstanding the success of light-sticks and the great progress in their increased luminous intensity, their use as a source of illumination is very limited. Because the luminous intensity of light-sticks cannot compare with that of a household incandescent light bulb and because of the inverse square law for light intensity (which decreases proportionally to the square of the distance), the light intensity generated from a chemiluminescent light-stick is insufficient to illuminate even the smallest rooms, areas, scenes or objects. However, because luminance (the light that an observer sees when looking directly at a light source) is invariant with distance, the light-stick appears very bright to the observer even when looking directly at the chemiluminescent light-stick source at a distance. Thus the light stick is much more useful as a luminant signaling or marking device than as a source of illumination, reflecting on an impinged object. Therefore, chemiluminescent light-sticks are best applied to situations where the observer can look directly at the chemiluminescent source as a type of signal, marker or indicator.

The primary disadvantage of chemiluminescent light-sticks is that they are single-use. Once the two components are mixed and the chemiluminescent reaction has begun, the reaction proceeds to completion. The light-stick cannot be re-used or re-started for a second use and must be discarded. Yet another disadvantage of the light stick is the waste generated from the disposal of the chemical light devices; for example, many of the light-sticks used for marine applications are thrown overboard and later wash up on beaches. Solving the problem of a single-use chemiluminescent marker, which is discarded after only one use is therefore, very desirable.

Many of the disadvantages associated with chemiluminescent light-sticks, such as their single-use, limited luminous intensity and waste disposal have been solved by utilizing an alternative to the glass ampoule enclosed in a flexible plastic tube package. One method of producing a multiple-use chemiluminescent, biodegradable marking device is to comprise a mixture of a chemiluminescent compound together with a gas. Such a mixture of chemiluminescent ingredient and propellant can be stable under pressure and once released to the atmosphere, reacts with the oxygen in the air to produce a chemiluminescent light, by means of an exploding or fused frangible disk for single-use or released by means of a spring-loaded nozzle and spray actuator for multiple-use.

The type of compounds known to produce chemiluminescence simply upon contact with air or oxygen, are called oxyluminescent. A class of oxyluminescent compounds is called peraminoethylene and one example of a suitable peraminoethylene is known as tetrakis(dimethylamino)ethylene (TMAE). Such a chemiluminescent spray formulation is disclosed in U.S. Pat. No. 3,697,434, whose use is claimed for nighttime sea or land rescue markers.

However, peraminoethylene, and specifically TMAE, is flammable and produces a highly flammable vapor. TMAE is also a corrosive safety hazard, can be very destructive to human mucous membranes and has an unpleasant amine odor. All of these properties of oxyluminescent compounds, such as TMAE, make it too dangerous for consumer applications. Therefore, a multiple-use chemiluminescent, biodegradable marking device, for consumer applications, is very desirable.

Because of the safety hazards associated with oxyluminescent compounds, two-part chemical systems have dominated both commercial and military chemiluminescent devices. For two-part chemiluminescent systems, the first part usually consists of a fluorescer and the second part consists of an activator. Such a two-part system is the basis of the pre-described light-stick. However, all two-part chemiluminescent devices can be used only once and then must be discarded. This is because the chemical activation of the fluorescer is accomplished by fracturing the inner compartment of a tubular housing, which combines the two reactants and thus creating the chemiluminescence.

U.S. Pat. No. 3,612,857 describes a location marker, which uses the same chemical activation method, namely fracturing an inner compartment, but also ejecting a strip of cloth saturated with a chemiluminescent material when activated by a firing pin, which detonates and ignites a gas-generating pellet. In this single-use chemiluminescent marker configuration, a piston within the device ejects the chemically saturated cloth and activated mixture of chemicals, to produce a chemiluminescent reaction.

U.S. Pat. No. 3,584,211 describes yet another chemiluminescent device utilizing a rupturable pod, or inner compartment, in which the contents may be dispensed or poured onto a surface by means of opening a screw cap closure. However, this design reflects yet another a single-use chemiluminescent design and once the reaction is initiated, the chemiluminescent reaction cannot be stopped, re-started or used at a later date.

Another marker system is described in U.S. Pat. No. 3,940,605, which is a two-part chemiluminescent marking system activated by generating an explosive gas by a frangible means or an explosive actuator to trigger the mixing and eject the two parts; namely the fluorescer and activator. Such a system is capable of marking an intended area by ejecting the entire contents of the two-part chemiluminescent by a percussive explosion, spreading the activated chemiluminescent reactants into an open area. Yet another two-part, single-use, chemiluminescent marking system (U.S. Pat. No. 4,682,544) employs a fuse or percussive cap to release a fluorescer, activator and propellant. Such a system has been found useful in bomb simulation exercises for military training exercises. However, the ability of a chemiluminescent marking system capable of multiple uses is still highly desirable. Furthermore, a chemiluminescent system capable of directing the reacted components such that an articulated message can be conveyed is also highly desirable.

Yet another marker system for spraying two-part chemiluminescent mixtures into the atmosphere, described in U.S. Pat. No. 3,744,718 was airlifted in a military aircraft, using a storage tank and pressure regulator system. This system was designed to produce chemiluminescent clouds for long-range detection by airborne observers. Even if the atmospheric chemiluminescent cloud mixture settled to the ground after spraying, any written text, numerics, alpha-numerics, figures, drawings, emergency messages, trail markings, lanterns or distress calls or any kind would be completely indiscernible. Furthermore, the system is single-use and is not scalable for any consumer or commercial applications, because dual-dispensing aerosol systems for commercial chemiluminescent aerosol cans require a combination of fixed and flexible internal compartments, such as; bags, pouches or bladders.

A commercially viable, chemiluminescent aerosol spray has been demonstrated by Miller using a binary composition of two fluids in two separate chambers comprising a chemiluminescent fluorescer fluid in one chamber and an activator fluid in a second chamber, both at an atmosphere greater than one and simultaneously co-dispenses both fluids from the separate chambers, initiating a chemiluminescent reaction in a fine stream (U.S. application Ser. No. 12/287,653 and PCT/US2009/04485). This improved method of packaging, known as a dual-dispense aerosol spray can, is reusable and capable of delivering the chemiluminescent power of many glow sticks all at once or the power of a single glowsticks for many nights.

The chemiluminescent chemical reaction, produced by combining a fluorescer and activator, generates a bright luminous intensity when sprayed onto white or reflective substrates or surfaces, such as paper or fabric. However, the light intensity is greatly diminished when the chemiluminescent mixture is sprayed onto darker surfaces, such as asphalt, glass, land, trees or grass. This is because the principal ingredient in the chemiluminescent formulation is typically an ester, such as benzoate, citrate or phthalate. These esters are clear, colorless liquids which function as the diluent for the chemiluminescent reaction. Because they are clear liquids, they transmit the light generated from the chemiluminescent reaction. However, this chemiluminescent mixture also produces a transparent coating similar to a lacquer or varnish when applied to a surface. Therefore, without the ability of the chemiluminescent coating to reflect or scatter light, the color and texture of the coated surface will absorb much of the light output. Only by including light scattering compounds, such as those commonly found in household paint, will the luminous intensity produced from the chemiluminescent mixture be less dependent on the color of the sprayed surface. Therefore, a chemiluminescent formulation capable of marking dark or textured surfaces, such that an articulated message can be conveyed on dark colored or natural objects is highly desirable.

SUMMARY OF THE INVENTION

The invention, as illustrated herein, is clearly not anticipated, rendered obvious, or even present in any of the prior art mechanisms, either alone or in any combination thereof. A portable, versatile, and stable chemiluminescent composition of matter, aerosol spray mechanism and accompanying method, capable of marking dark or textured surfaces, such that a written message can be conveyed on natural objects with poor light reflectivity would afford significant improvement to numerous useful applications. Thus, the invention as illustrated herein, is clearly not anticipated, rendered obvious, or even present in any of the prior art mechanisms, either alone or in any combination thereof. Thus the several embodiments of the instant invention are illustrated herein.

In accordance with one embodiment, this invention relates to a binary composition of two fluids in two separate chambers comprising a first fluid in the first chamber consisting of a chemiluminescent fluorescer fluid and having a dispensing outlet controlled by a first valve and a second fluid in the second chamber consisting of a chemiluminescent activator fluid and having a dispensing outlet controlled by a second valve different from the first valve, and an actuator connected to each of the first and second valves; which simultaneously co-dispenses both fluids from the separate chambers, initiating a chemiluminescent reaction in a fine stream.

In one aspect, the invention relates to a chemiluminescent marking system capable of articulating, communicating, displaying or conveying chemiluminescent messages in the form of written text, numerics, alpha-numerics, figures, drawings, emergency messages, distress calls, trail markings, lanterns or directional traffic indicators on any surface including dark colored, textured surfaces as well as human skin.

In another of its aspects, this invention relates to co-dispensing a binary chemiluminescent system consisting of a fluorescer and an activator; wherein each chamber is pressurized with a compressed gas or compressed liquid gas propellant and which the mixture of fluorescer and activator are expelled to produce a chemiluminescent aerosol spray.

In another aspect, this invention relates to a composition comprised of two or more chambers, with each chamber containing a dispensing valve, and which each valve is connected to an actuator which simultaneously co-dispenses and mixes the fluids from each of the two chambers thereafter expelling the contents of the two chambers to produce a chemiluminescent fluid mixture.

In yet another aspect, this invention relates to a composition of two fluids wherein each fluid is contained in a flexible chamber, bag, vessel or bladder; both of which are contained in a third, fixed and pressurized container. The pressurized gaseous or liquid propellant fills the space between the outside of the flexible chambers and the inside of the fixed container. The flexible chambers are concentric, with the first flexible chamber being placed or affixed inside the second flexible container. Both flexible containers are pressurized either by injecting the propellant through a one-way rubber grommet valve in the bottom of the can or by pressurizing the fixed container prior to filling the flexible and sealing the flexible chambers in the fixed container.

In another aspect, this invention relates to a chemiluminescent aerosol spray composition comprised of two chambers with each chamber connected to an actuator and which simultaneously co-dispenses the fluids, however the fluids in the chambers are not connected by any means and the co-dispensed fluids are allowed to mix outside the chambers and away from the actuators in the air before striking the substrate.

In yet another of its aspects, this invention relates to a binary chemiluminescent system consisting of two parts, a fluorescer and an activator; wherein the contents of each chamber is released from the action of a dual-mechanical, co-dispensing push-button pump. The chemiluminescent aerosol spray composition has an internal pressure of 1 atmosphere and a chemiluminescent aerosol spray is produced by a hand or finger-actuated co-dispensing pump spray, wherein the contents of each chamber is released from the action of a dual-mechanical, co-dispensing push-button pump. Each of these components for the chemiluminescent, aerosol marker systems will be discussed in more detail.

Yet another embodiment of this invention is to incorporate light scattering compounds into the chemiluminescent formulation such that the reflectivity of the marked surface or substrate is inconsequential with regard to light production.

In another of its aspects, this invention relates to a binary chemiluminescent system consisting of a fluorescer and an activator; wherein the formulation includes inorganic light scattering compounds, such as titanium dioxide, talc, barium sulfate or nanoparticulate barium titanate.

In another of its aspects, this invention relates to a binary chemiluminescent system consisting of a fluorescer and an activator; wherein the formulation includes organic light scattering compounds, such as polymeric microspheres also known as Rhopaque™ Ultra or Rhopaque™ Ultra E Opaque Polymer (Rohm and Haas, Philadelphia, Pa.).

In yet another of its aspects, this invention relates to a binary chemiluminescent system consisting of a fluorescer and an activator; wherein the formulation includes organic light scattering compounds and a polymeric resin to suspend the particles or microspheres.

In another of its aspects, this invention relates to co-dispensing a binary chemiluminescent system wherein the expelled composition of fluorescer and activator contains another component for altering the viscosity or viscoelastic properties of the ejected material to suspend or render homogenous the light scattering particles, such as in a paint or facial makeup.

In yet another of its aspects, this invention relates to a liquid chemiluminescent marker or writing instrument, particularly of the felt tip type, having a bifurcated reservoir containing fluorescer and activator. The cylindrical body supports the writing tip, which communicates with the fluorescer and activator writing fluids. The fluids are expelled and co-dispensed from the chambers by means of gravity and capillary action to produce a chemiluminescent marking.

There has thus been outlined, rather broadly, the more important features of the versatile system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention may be better understood after reading the following detailed description of non-limiting embodiments and upon examining the accompanying drawings, in which:

FIG. 2A is a diagrammatic axial section view of the device showing a dual-dispense chemiluminescent aerosol spray mixing chamber shown in FIG. 2.

FIG. 4 is a diagrammatic axial view of a dual wick dispenser for a chemiluminescent marker.

FIG. 4A is a close up view of a dual wick dispenser for a chemiluminescent marker with a recessed barrier shown in FIG. 4.

FIG. 5 is a cross-sectional view of the separate fluorescer and oxidizer compartments of the chemiluminescent marker shown in FIG. 4.

FIG. 5B is a close-up view of a dual wick dispenser for a chemiluminescent marker with barrier being fully extended to the felt tip shown in FIG. 5.

DETAILED DESCRIPTION OF THE DRAWINGS

Figure 1:
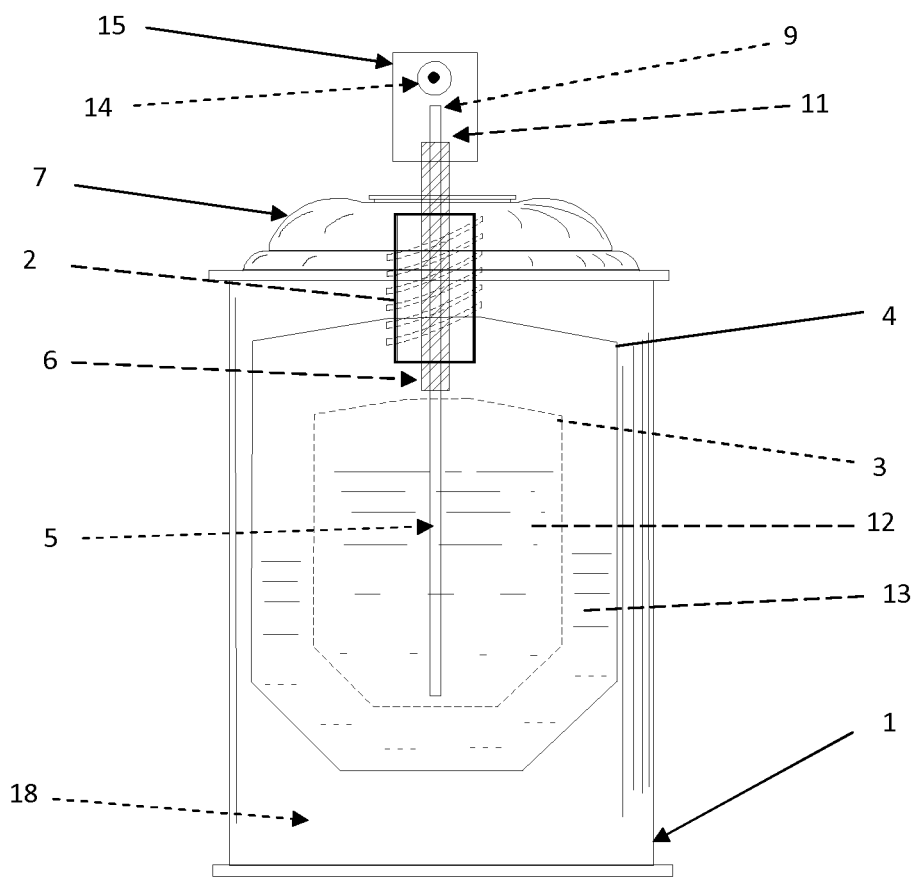
FIG. 1 is a diagrammatic axial section view showing a re-usable, dual-dispensing, chemiluminescent aerosol spray system, with two concentric, flexible bags of the present invention.

The preferred embodiment of the present invention will be described with reference to FIG. 1 of the drawing. FIG. 1 is the first exemplary embodiment of a device for producing a chemiluminescent aerosol spray by means of a co-dispensed, pressurized aerosol container. The device comprises a fixed chamber, vessel or can 1, which may be made out of aluminum, steel or plastic. The spring-loaded valve assembly 2, flexible, concentric bags 3,4, dip-tubes 5,6 and cup assembly 7 are inserted into can 1 pressurized using compressed air or nitrogen 18 and then sealed. Inner concentric, flexible bag 3 is filled by injecting activator solution 12 through inlet 9. Thereafter, outer flexible bag 4 is filled by injecting a combination of fluorescent dye and oxalate solution 13 through inlet 11. The device further comprises a combination nozzle 14 and actuator 15, such that when actuator 15 is depressed, spring-valve assembly 2 opens, allowing chemiluminescent liquids 12,13 to escape through dip tubes 5,6 and out of dip-tube openings 9,11. The two, co-dispensed, chemiluminescent liquids 12,13 are then combined in actuator nozzle 15 and ejected through outlet 14.

Figure 2:
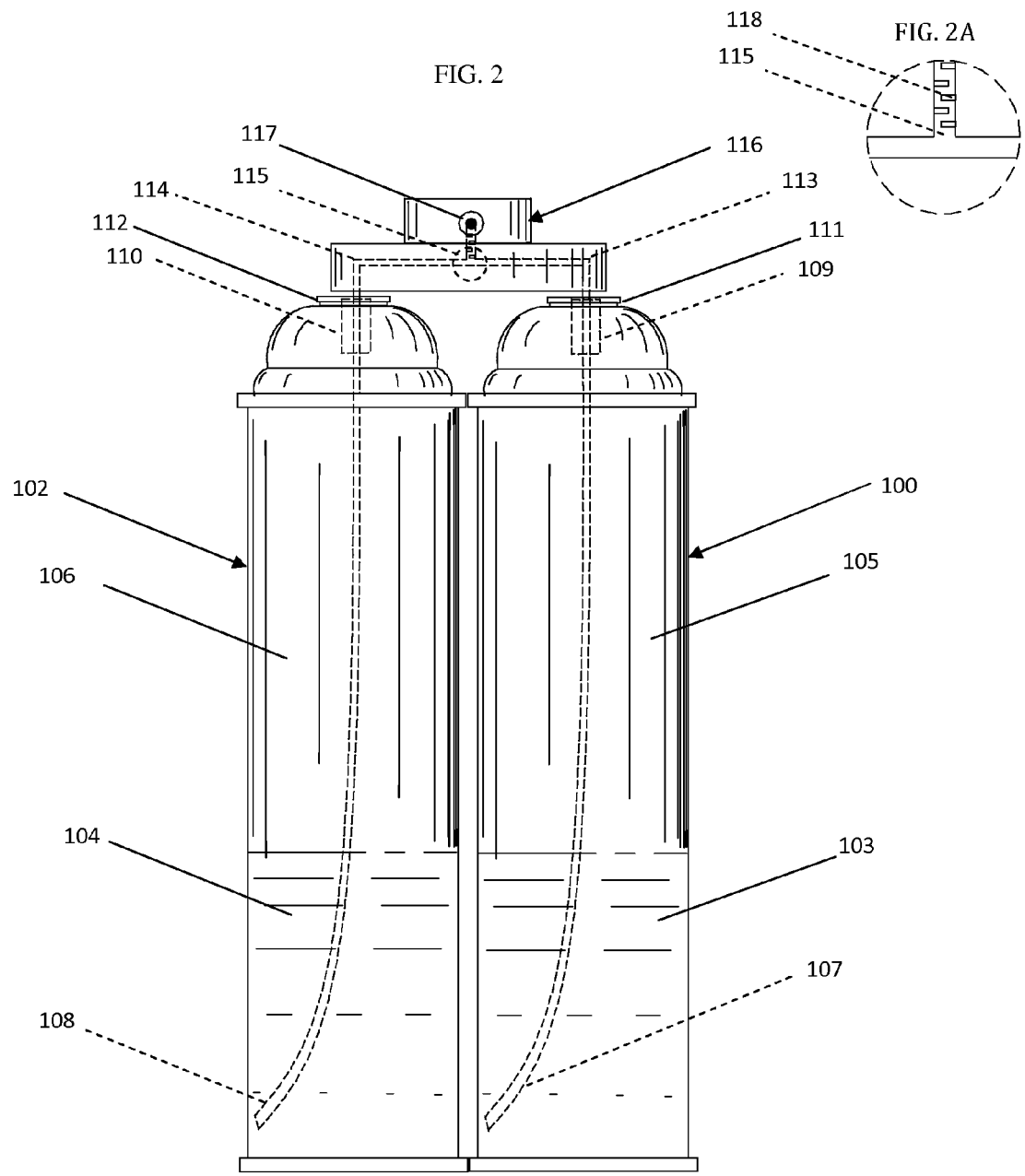
FIG. 2 is a diagrammatic axial section view of a re-usable, dual-dispensing, chemiluminescent aerosol spray system, with separate, fixed chambers.

FIG. 2 is an exemplary embodiment of a device for ejecting a chemiluminescent spray by means of a co-dispensed aerosol spray using two fixed chambers. The device comprises a first chamber 100, which may be made out of steel or aluminum and a second chamber 102, which may also be made from steel, aluminum or some other suitable material. Each of the fixed chambers 100, 102 respectively, defines a first reservoir 103, containing a liquid fluorescent dye and the second reservoir 104, containing a liquid oxidizer. Once filled with the chemiluminescent liquid formulations 103, 104 the first chamber 100 is sealed with cap 111 and the second chamber 102 is sealed with cap 112. Each of the cans liquids 100, 102 are pressurized by propellant gases 105, 106, such as 1,1,1, 2-tetrafluoroethane or dimethyl ether, which are miscible in the chemiluminescent fluid but do not react and which can be injected directly through the actuators 109, 110 and through the dip tubes 107, 108. The device further comprises a combination nozzle and mixing valve 116, such that when valve 116 is depressed, actuator valves 109, 110 open and allow chemiluminescent liquids 103, 104 to escape through dip tubes 107, 108, and into the nozzle channels 113, 114. The two, co-dispensed, chemiluminescent liquids are then combined at the mixing chamber 115 and subsequently ejected through outlet 117. FIG. 2A shows the mixing chamber 115 and mixing elements 118 which functions by converting the laminar flow through the nozzles 113, 114 into turbulent flow thus mixing the two chemiluminescent components.

Figure 3:
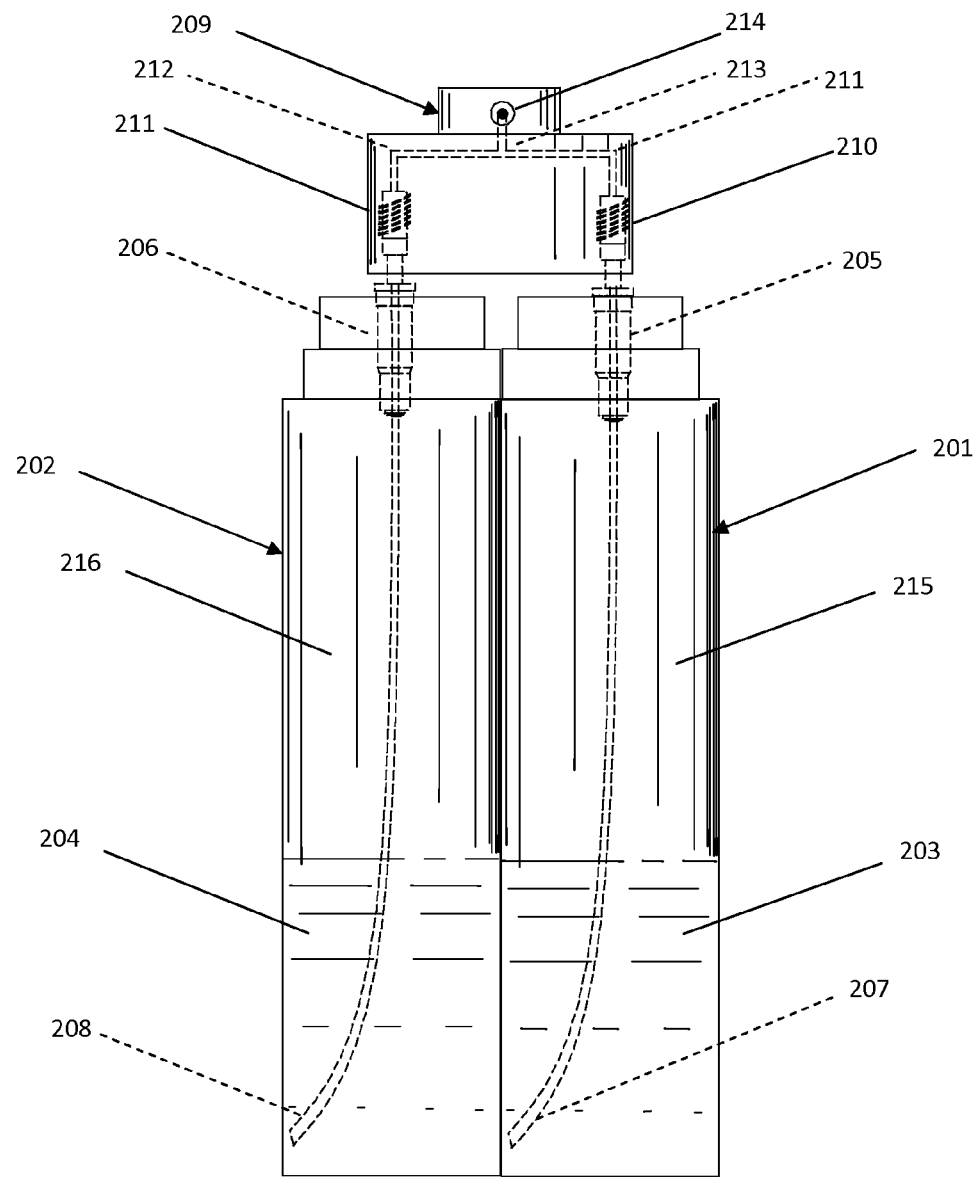
FIG. 3 is a diagrammatic axial section view of the device showing a dual-dispense chemiluminescent pushbutton spray bottle.

FIG. 3 is an exemplary embodiment of a device for ejecting a chemiluminescent spray by means of an aerosol spray pump. The device comprises a first vessel 201, which may be made from an elastically deformable plastic material, such as styrene ethylene butadiene, and a second interlocking vessel 202, which may also be made out of the same plastic. Each of the vessels 201, 202 respectively define a first reservoir 203, containing a liquid fluorescent dye and the second reservoir 204, containing a liquid oxidizer. Once filled with the chemiluminescent liquid formulations 203, 204 the first can is sealed with the pump valve 205 and the second vessel is filled with the pump valve 206. The containers sealed by pump valves 205, 206 are preferably hermetic at standard temperature and pressure. Since the pump valves 205, 206 do not pressurize vessels 201, 202, any gas 215, 216 such as air may be present. Pushbutton 209 is movable relative to the base portions 201, 202. Once pushbutton 209 is depressed, pumps 205, 206 dispense the chemiluminescent liquids 203, 204 through the diptubes 207, 208 and into the nozzle channels 211, 212. The two, co-dispensed, chemiluminescent liquids are then combined at the mixing chamber 213 and subsequently ejected through outlet 214. The pumps 205, 206 are returned to their ready position by means of helical springs 210, 211.

FIG. 4 describes an exemplary embodiment of a device for producing a chemiluminescent mark by means of a co-dispensed liquid marking instrument. Such a marking instrument consists of a hollow tubular sleeve 301 and a dual felt wick tip 302 located coaxially and at the end of the marker. The hollow tubular sleeve 301 is designed for manual gripping and for containing the chemiluminescent liquids. FIG. 4A describes a close-up view of the felt tip, bifurcated by barrier 302, which may be made out of polyethylene or some other chemical resistant element. The bifurcated felt tips 303, 304 and barrier 302 are fastened to a smaller diameter hollow barrel sleeve 301. FIG. 4A shows a felt tip with a recessed barrier element 302. FIG. 4B describes yet another exemplary embodiment of the device in which the divider 302, extends fully to the same length as the felt tips. Controlling the extent to which the chemiluminescent felt tips are separated, either by an air gap or by the barrier element, serves to maximize the chemical mixing on the substrate to be marked.

As further shown in FIG. 5, the hollow tube 401 contains two separate reservoirs 402, 403 which are separated by a barrier element 404. Typically, the first reservoir containing a liquid fluorescent dye 413, and the second reservoir containing a liquid oxidizer 414 such that the two chemiluminescent fluids are not mixed until they come in contact with the substrate. The chemiluminescent liquids advance out of the felt tip and to the substrate by means of capillary action. No internal pressure or means of expelling the chemiluminescent ingredients are required other than the pressure of the felt tips with the substrate to be marked.

Naturally, the invention is not limited to the embodiments described above and various modifications to the devices described above are fully contemplated. Although the present invention herein has been described with reference to particular embodiments, it is to be understood that these embodiments are merely illustrative of the principles and applications of the present invention. It is therefore to be understood that numerous modifications may be made to the illustrative embodiments and that other arrangements maybe devised without departing from the scope of the present invention.

DETAILED DESCRIPTION OF THE INVENTION

The present invention relates to a composition of two separate fluids, which are ejected through a mixing chamber, by means of an aerosol spray or by pump action; upon which the combined fluids produce chemiluminescent radiation. The chemiluminescent radiation can be in the range of 400-700 nm and hence visible to the naked eye and present itself in the form of a color or emit light across the entire visible spectrum and appear white. Alternatively, said radiation can be outside the visible spectrum and produce chemiluminescent radiation in the infra-red regions with a peak intensity of approximately 790 nm or in the ultra-violet region with a peak intensity of approximately 365 nm.

A bifurcated or dual-chambered system, capable of simultaneously co-dispensing both fluids, is preferred for producing a stable composition. By spraying or ejecting the combined chemical formulations onto a common object, such as fabric or paper; the chemiluminescent mixture provides sufficient luminance to be detected at a distance. Also, by incorporating a polymeric resin, such as polyhydroxystyrene, polyvinyl alcohol, carboxymethylcellulose or some other viscous thickening agent into the chemiluminescent formulation, the viscosity can be increased to approximately 500 centipoise or more. Such an increase in viscosity allows for the ejected chemiluminescent mixture to remain at the point of contact on the sprayed surface and allow for written text, numerics, alpha-numerics, figures, drawings, directions, emergency messages, distress calls or other conveyances to be created. Furthermore, by combining the viscous thickening agent with an optical dispersant, such as titanium dioxide or sub-micron polymeric spheres, textured or dark colored surfaces, such as pavement, roadway, grass, dirt or even skin and hair can be marked for easy night-time identification.

Since only a portion of the composition is ejected onto the substrate during use, the invention is capable of re-releasing the same components once re-actuated. The mixed and activated chemiluminescent composition does not form a precipitate in the mixing valve, maintaining a clear path for the next actuation. Because the system remains clear after use, an aerosol spray or pump spray can be actuated numerous times until the chemiluminescent contents or propellant is exhausted. Thus a completely re-usable, night-time signaling tool is created.

By combining the features of multiple use, high viscosity and long shelf life, a chemiluminescent spray expands its utility to become a practical and sophisticated signaling device, capable of communicating a wide variety of text messages, signal indicators, graphic icons and emergency messages.

Normally, luminous intensity, peak intensity, duration and dominant wavelength (color) are some of the principal considerations given to chemiluminescent systems. However, because the materials are ejected, special consideration had to be given to the human and environmental impact. Therefore, a safe, non-toxic, non-flammable, non-irritating, biodegradable spray marker was produced, by formulating an aqueous composition for co-dispensing with a portable aerosol spray can and with a finger-actuated spray pump.

(1) Aerosol Spray Systems

The configuration of the present invention, known as a bag-in-bag, is comprised of a binary composition, of fluorescer dye, oxalate, oxidizer, solvent, catalyst and propellant divided into three parts. The preferred method is to divide the composition such that the first part contains a fluorescer dye, oxalate and solvent, the second part comprises an oxidizer, catalyst and solvent; while the third part contains a gaseous propellant. The first and second parts are contained in flexible bags, liners or pouches, while the third part is a fixed container that contains the first two parts. A stream of chemiluminescent light is emitted once the first and second parts are simultaneously co-dispensed through adjoined actuator valves and from which the individual parts are combined through a common mixing valve. The pressure to expel the first two parts comes from the gaseous propellant, which occupies the space between the outside of the first and second parts and the inside of the third part.

The aerosol spray system can be configured in many different ways, some of which have an impact on the chemiluminescent formulation and choice of propellant. The following co-dispensing aerosol configurations are present in this invention and will be discussed in greater detail:

(A) Binary Aerosol: Dual, fixed chambers with miscible liquid propellants or fixed chambers lined with flexible bags (barrier can) and propellant separated (B) Barrier Can Plus Bag-on-valve: Single, fixed chamber lined with a flexible bag, valve attached to a second flexible bag with aspirator and propellant separated (C) Bag-in-Bag: Single, fixed chamber, valve attached to two concentric flexible bags and propellant separated (D) Pump Spray: Dual, fixed chambers with connecting valves and finger-pump action One method of embodiment, known as a binary aerosol system, consists of two or more suitable, pressurized vessels capable of releasing an aerosol spray. The specific elements of the invention are not critical provided that two-components can be co-dispensed in such a manner that the first component mixes with the second component either by means of a mixing chamber affixed to the actuator on each vessel or mixed upon contact with the substrate or surface.

One preferred mixing chamber suitable for combining the chemiluminescent components from the separate pressurized aerosol cylinders is a Mixtek actuator, available from Mixtek Corporation (New York, N.Y.) as described in U.S. Pat. No. 6,877,924.

Yet another commercially viable aerosol package suitable for simultaneously co-dispensing two chemiluminescent chemical components is described in U.S. Pat. No. 7,021,499, wherein the dispensing orifice is positioned distal from the second pressurized canister and the package comprises an integrally molded actuator body. In this embodiment, the first actuator releases the components from the first part and, by means of a cantilever, simultaneously triggers the second actuator also releasing the components from the second part.

The vessel material is not critical but preferably made from steel, aluminum or plastic, however any vessel material is suitable provided that a chemiluminescent, night-time signal marker can be ejected to a substrate or surface. The interior wall of the vessel can also be coated with an epoxy material such as epoxybisphenol-A-novolac, a tin (Sn) metal coating or some other coating suitable for preventing a chemical reaction of the composition with the interior of the container.

The pressure contained inside the vessel, is generally greater than 1 atmosphere and more preferably in the range of 20 to 100 pounds per square inch (PSI), and most preferably from 40 to 60 PSI. The preferred internal vessel pressure is about 50 PSI.

The preferred propellant of this invention is an inert hydrocarbon, which is a gas at standard temperature and pressure, but also a liquid under pressure. Several examples of suitable propellants for this invention include: dimethoxymethane, ethyl acetone, acetone, dimethyl ether, 2-methoxyethanol, 2-ethoxyethanol and butanol. One preferred propellant is dimethyl ether, however azeotropic mixtures of this and other propellants, such as carbon dioxide, nitrogen or air may also be used.

Another preferred propellant of this invention is known as 1,1,1,2-tetrafluoroethane (TFE-134), which is not only a gas at standard conditions and a liquid under pressure, but also forms a single-phase, homogeneous mixture with the chemiluminescent formulation. TFE-134 is also non-ozone-depleting propellant, which is miscible in the preferred solvents of this invention, namely; dibutylphthalate and tertiary butanol.

While the propellant may be mixed with the chemical ingredients in each part, two dual, fixed chambers capable of withstanding the internal pressure of the propellant without deforming are required. Furthermore, miscibility of the liquid propellant in the chemiluminescent formulation may be required for the propellant to be placed in the same container. However, the requirement for the propellant and solvent to be miscible can be overcome by placing the chemical ingredients in a so-called Sepro® barrier can (Continental Group), which is a fixed chamber, container or can lined with a flexible bag, bladder or pouch. Thus the chemical ingredients are separated from the propellant and can be sealed in the can while the propellant fills the space between the can and the flexible bag. However, this spray can configuration usually requires the chemiluminescent liquids to be filled from the top of the can and the propellant to be filled from the bottom; which is a somewhat clumsy and expensive filling method.

Such a system is preferred for compositions; which are not compatible with the propellant gas or gas mixture. Propellants which do change their physical state, from liquid to gas once released to standard pressure, but do not form a single-phase pressurized mixture with the chemiluminescent composition often require such a system for producing a stable, pressurized aerosol composition.

Another method of embodiment is to combine a Sepro® barrier can plus a special, Fusion bag-on-valve (Aptar Company, Crystal Lake, Ill.) in which the first part of the binary chemiluminescent compositions is contained in the flexible portion of the Sepro barrier can attached to the wall of the fixed container; while the second part is contained in the flexible container of the bag-on-valve. This special bag-on-valve also has a one-way valve affixed to the side of the valve chamber, which is capable of aspirating the first part along with the second part. In this embodiment, the flexible compartments or bladders serve as diaphragms to separate the composition from the propellant, which is injected through a rubber grommet in the bottom of the barrier can. The propellant fills the space between the outside of the flexible pouch and the inside of the barrier can. The flexible nature of the bladder transfers the pressure generated from the propellant gas or gas mixture through the bladder, forcing the composition through the release valve. Once the bag and bladder are filled with the chemical compositions and sealed, the can is pressurized by injecting the propellant gas or gas mixture through a rubber gasket, rubber seal or one-way valve typically found in the bottom of the can.

The preferred configuration, for a binary chemiluminescent aerosol spray system, is to have a single fixed container filled with two concentric flexible bags. In this way, no aspiration valve is needed and both parts are dispensed equally and evenly through separate, concentric valve stems, and without the need for a special can or for the propellant to be injected into the bottom of the can. In this embodiment, the bi-power-valve (Lindal Group, Phoenix, Ariz.) dispenses both chemiluminescent parts from a three-chamber system all contained within a single, standard aerosol can.

The bi-power valve and aluminum cap are affixed to an aluminum, steel or plastic can, pressurized to about 50 psi and sealed. The first chemiluminescent part is injected through the inner valve stem into the inner bag and the second part is injected through the outer valve stem into the outer bag to a final pressure of about 100 psi. Finally, an actuator is placed on the valve stem.

Yet another method of co-dispensing two chemiluminescent components is by means of an aerosol pump spray. Such a system, commercially known as Versadial (U.S. Pat. No. 7,222,752), is available in a binary interlocking configuration and which is compatible with a wide variety of chemiluminescent solvents, fluorescers and oxalate compositions. This finger-actuated chemiluminescent aerosol pump configuration is capable of producing the same liquid chemiluminescent stream for alphanumeric signals as the propellant aerosol pump spray. The chemiluminescent ingredients do not necessarily have to mix in the connecting valve and exit the aerosol can as a single, mixed stream; but may also mix in the stream outside the vessels or upon contact with the substrate or surface.

(2) Chemical Composition

There are a wide number of components that can be chosen to produce a chemiluminescent reaction. The selection of these components and their concentrations in the formulation can influence the emission spectrum, light intensity and reaction duration. Some of the chemical ingredients that control these chemiluminescent properties are the oxalate, fluorescer dye, and catalyst structures. The concentration of these chemical ingredients can also have an impact on the chemiluminescence. Likewise, the concentration of hydrogen peroxide ($H_2O_2$), also known as the reactant or oxidizer, as well as the choice of solvents, has an impact on the performance of the chemiluminescent chemical composition.

The preferred class of oxalates contains a carbalkoxy substituent in the ortho position to the phenolic oxygen. One preferred oxalate is bis(2-carbopentyloxy-3,5,6-trichlorophenyl)oxalate or bis(2,4,5-tricholoro-6-carbopentoxy)oxalate (CPPO). Another preferred oxalate is bis(2,4,5-trichloro-6-carbobutoxyphenyl)oxalate (TCCPO). Yet another preferred oxalate compound is bis(2,4,6-trichlorophenyl)oxalate (TCPO). The oxalate concentration can vary from 0.01 moles/liter (M) to 1.5 M, but the preferred concentration is 0.03 M to 0.03 M.

Many fluorescent compounds fall into the above criteria, however a second performance criteria is that the fluorescent compound must not readily react with peroxides, such as hydrogen peroxide or with esters of oxalic acid. A preferred fluorescent compound is one which has a spectral emission in the ultra violet (UV), visible or infra-red (IR) regions or has a dominant wavelength emission between 350 to 1200 Ångstroms. The preferred list of conjugated, polycyclic aromatic compounds, having at least 3 contiguous rings includes: anthracene, benzanthracene, phenanthrene, naphthacene, pentacene or perylene. The preferred fluorescers include: 9,10-diphenyl anthracene (for a blue emission), 9,10-bis(phenylethynlyl)anthracene (green) or 5,6,11,12-tetraphenylnapthacene (red). The fluorescer concentration is not critical and functions well in the range of 0.0002 M to 0.03 M, however the preferred concentration is between 0.001 M to 0.005 M.

The emission spectrum of the chemiluminescent reaction can also be broadened by the incorporation of more than one fluorescer dye. This results in the emission of more than one wavelength of light, giving the appearance of a white-light emission spectrum. For an efficient, near white-light chemiluminescent emission, the combination of blue fluorescer dye, 9,10-diphenylanthracene and yellow fluorescer dye, 1-chloro-9,10-bis(phenylethynyl)anthracenes, are preferred.

The dominant wavelength of the chemiluminescent spectral emission can also be shifted out of the visible spectrum and into the near infra-red spectrum, producing an invisible chemiluminescent radiant flux. Such an infra-red radiant, chemiluminescent aerosol marker is useful for producing, covert text or graphical messages detectable only by infra-red sensors or detectors. The preferred fluorescer dye for an infra-red peak emission of 790 nm is 16,17-dihexyloxyviolanthrone (See "Development of High Radiation Output Infrared Chemiluminescent Systems", Mohan et. Al, Defense Technical Information Center, August 1979).

The catalyst, by nature, is not consumed in the chemical reaction; therefore its concentration is not critical. However, the preferred list of catalysts include: amines, hydroxide, alkoxide, carboxylic acid salts and phenolic salts; whose conjugate acid salts have a pKa between 1 and 6 in aqueous solutions. Some of the preferred catalysts for this invention are: sodium salicylate, lithium salicylate, tetrabutylammonium salicylate, potassium salicylate, tetrahexylammonium benzoate, benzyltrimethylammonium m-chlorobenzoate, dimagnesium ethylenediamine tetracetate, tetraethyl ammonium stearate, calcium stearate, magnesium stearate, calcium hydroxide, magnesium hydroxide, lithium stearate, triethyl amine, pyridine, piperidine, imidazole, triethylene diamine and potassium trichlorophenoxide. For this invention, the preferred catalyst is tetrabutylammonium salicylate at a concentration less than 0.1 M and preferably 0.01 M.

The oxidizer is usually a peroxide and is most commonly found as an aqueous solution of hydrogen peroxide ($H_2O_2$) in water or crystalline urea peroxide (carbamide). The concentration is not critical and can be found to vary anywhere from 0.01M to 10 M. The preferred $H_2O_2$ concentration for this invention is found to be approximately four times the oxalate concentration. Furthermore, production of the chemiluminescent reaction is not dependent on mixing order. Therefore, the chemical components can be separated into two or more parts to provide for a stable composition. Since the order of addition is not critical, the chemical components can be interchanged between parts inasmuch as the chemical components are solubilized and remain stable and in solution. One preferred configuration is to combine the oxalate and fluorescer components into the first part and the peroxide in the second part. Yet another preferred configuration is to combine the oxalate and fluorescer into the first part and the peroxide combined with a catalyst in the second part.

The choice of solvents for the chemiluminescent composition must be chosen to produce a stable composition, and high quantum efficiency for light production. A wide variety of solvents meet these criteria and can be used in either the oxalate containing part, the peroxide containing part or the peroxide without catalyst containing part. Some solvents are suitable for any of the aforementioned parts, but the preferred solvents can be identified by each part. Some of the preferred solvents for the oxalate part include esters, such as: acetyl tributyl citrate, triethyl citrate, ethyl acetate, butyl benzoate, benzyl benzoate, ethyl benzoate, dimethyl phthalate, dibutyl phthalate, diocytl phthalate, methyl formate, triacetin, diethyl oxalate or dioctyl terphthalate. Hydrocarbons such as acetone, aromatic hydrocarbons, such as: benzene, toluene ethyl benzene, butylbenzene, or chlorinated hydrocarbons, such as: chlorobenzene, orthodichlorobenzene, metadichlorobenzene, chloroform, carbon tetrachloride hexxachloroethane or tetrachlorotetrafluoropropane are suitable solvents however the use of these solvents can be limited by their toxicological, safety or environmental hazards. The preferred solvents for use in the oxalate part are acetyl tributyl citrate and benzyl benzoate.

The choice of solvents for the peroxide containing part is comprised from the list of primary, secondary or tertiary alcohols, such as: ethanol, methanol, hexanol, 2-ethylhexanol, 2-octanol, cyclohexanol, pinicol, glycerol, propylene glycol, polyethylene glycol, tertiary butanol and 3-methyl-3-pentanol; ethers, such as diethyl ether, diamyl ether, tetrahydrofuran, dioxane, dibutyldiethyleneglycol, perfluropropyl ether or 1,2-dimethoxyethane; or esters such as; ethyl acetate, ethyl benzoate, dimethyl phthalate, dioctylphthalate, propyl formate or triethyl citrate. However, the preferred solvents for the peroxide containing part are polyethylene glycol and triethyl citrate. Combinations of solvents are also suitable and effective in improving propellant compatibility.

Hydroxylic solvents, such as water or alcohols, namely; ethanol, octanol or bases should not be used with the oxalate part, but are commonly found in the peroxide part. Hydrogen peroxide is rarely available as a 100% solution and the presence of water is found to stabilize the hydrogen peroxide and prevent auto-detonation prior to formulation.

Unlike the chemiluminescent aerosol spray and pump spray formulations, the chemiluminescent marking pen requires a different selection of solvents. For example, the solvent boiling point should be more than 120° C., so that the ink does not rapidly dry out in the pen. Also, any water present in the formulation should be salt-free so as to insure miscibility with the organic solvent. Alkylene carbonates and alkyl carbonates are preferred for the chemiluminescent pen marking formulation because their boiling point, at standard pressure is 200° C. and they have a vapor pressure of less than 0.05 mbar at 20° C. The alkyl and alkylene carbonates are also found to be smear-proof and rapidly penetrate the drawing material. Some of the preferred alkylene carbonate solvents for the chemiluminescent pen formulation include 1,3-dixolan-2-one, 4-methyl-1,3-dioxolan-2-one or propylene carbonate. Since alkylene carbonates are not miscible with water, mixtures of alkylene carbonate and alkyl carbonates are used to provide water miscibility.

(3) Optical Dispersants

There are also a wide number of components that can be chosen to convert a transparent chemiluminescent coating into a chemiluminescent paint. By far the most common method is to disperse a pigment such as titanium dioxide in the formulation. However, the pigments do not dissolve in the paint formulation and therefore require a surfactant to facilitate a uniform dispersion of the pigment particles. Even with the surfactant, paints must still be manually mixed prior to use to redistribute the pigment. Spray paint cans commonly incorporate a steel ball to facilitate manual mixing of the pigment.

In addition to the pigment and surfactant, paints must also incorporate a polymer which serves as the matrix for the paint formulation. There are a wide variety of organic and aqueous polymers that can be used for paint formulations, however by far the most widely accepted polymer used for paints during the last fifty years is the water-based styrene butadiene latex polymer. Aerosol latex paints commonly use an emulsion of a pigmented aqueous dispersion of a water insoluble vinyl acetate-acrylic copolymer resin in a liquid propellant containing a cationic surfactant.

The choice of polymers for chemiluminescent paints is sufficiently large provided that the luminous intensity and duration are not reduced. Unfortunately, the inclusion of most polymers effect either the luminous intensity or the light duration or both. However, a few polymers, such as poly (vinyl acetate), have found to have no impact on the chemiluminescent quantum yield. Because of its lack of impact on the chemiluminescent reaction, poly(vinyl acetate) is the preferred polymer for chemiluminescence.

The preferred method of embodiment is to incorporate a 5-10% (weight/weight) addition of poly(vinyl acetate) molecular weight 170,000. Alternatively, additions of Carbomer 940, glycerol, polyethylene glycol or triethanolamine can be used to increase the viscosity enough to suspend the pigment or microspheres.

In comparison to conventional aerosol spray paints, chemiluminescent spray paint does not necessarily require a surfactant to disperse the translucent or opaque pigment, such as titanium oxide, because sufficient dispersion can be obtained by simply increasing the viscosity with polymer additions. Furthermore, most surfactants, whether they are ionic or non-ionic, tend to sequester or extinguish the chemiluminescent reaction and thus eliminate the light output altogether.

Although pigments are effective in scattering light and reflecting the chemiluminescent coating reflective on dark and textured surfaces, they can cause a series of problems with aerosol spray cans. Pigments, although 10-20 microns in diameter, tend to be irregular in shape and agglomerate in solution. This causes the paint nozzle or actuator to clog, rendering the spray can inoperative. Furthermore, in spite of the use of surfactants, pigments still settle out of the formulation.

Alternatively, chemiluminescent paint pigments can be replaced altogether by incorporating micron-sized polymeric spheres, such as Rhopaque™ Ultra or Rhopaque™ Ultra E Opaque Polymer (Rohm and Haas, Philadelphia, Pa.). Such microspheres are approximately 10 micron diameter polymer shells usually filled with water or air. In this embodiment, the specific gravity of these spheres is much lower than inorganic pigments. Therefore, they do not tend to settle out and thus require no dispersants to maintain a uniform suspension. Furthermore, because the microspheres are near-perfect spheres, they do not tend to agglomerate or clog the aerosol paint nozzle. Therefore, the propensity of the aerosol spray nozzle or actuator to clog is greatly reduced.

Although there are many different combinations and permutations to incorporate polymeric binders, viscosity increasing agents and translucent or opaque additives into the chemiluminescent parts; the preferred method of embodiment consists of incorporating the polymeric binder into both the fluorescer part and the activator parts of the two-part chemiluminescent system.

As with the viscosity increasing agent, the pigments or microspheres can be incorporated in either the fluorescer or the activator part. The preferred method of embodiment is to incorporate the microspheres into the fluorescer part only.

EXAMPLES

The present invention is further described in detail by means of the following Examples and Comparisons. All parts and percentages are by weight and all temperatures are degrees Celsius unless explicitly stated otherwise.

Example 1

A reusable, blue aerosol spray chemiluminescent marker formulation was prepared by combining 5.42 grams of bis(2-carbopentyloxy-3,5,6-trichlorophenyl)oxalate (CPPO) and 0.059 grams of 9,10-diphenylanthracene into 80 grams of dibutylphthalate solvent. The mixture, designated as part A, was sonicated for 10 minutes to facilitate dissolution. The contents were decanted from the mixing vessel into a 30×160 mm aluminum aerosol cylinder, sealed with an aluminum mounting cup containing a butyl rubber gasket, a nylon tilt valve and a Teflon (PTFE) dip tube manufactured by Precision Valve Corporation (Yonkers, N.Y.). The sealed aerosol container and valve combination were injected with 6.5 grams of 1,1,1,2-tetrafluoroethane (TFE-134) through the valve stem to a pressure of about 50 pounds per square inch (psi). A separate mixture, designated part B was prepared by adding 2.91 grams of 35% hydrogen peroxide and 0.016 grams of sodium salicylate to a mixture of 64 grams of dibutyl phthalate and 16 grams of tertiary butanol. The contents were decanted from the mixing vessel into a separate 30×160 mm aluminum aerosol cylinder, sealed with an aluminum mounting cup containing a butyl rubber gasket, a nylon tilt valve and a Teflon (PTFE) dip tube manufactured by Precision Valve Corporation (Yonkers, N.Y.) and injected with 6.5 grams of 1,1,1,2-tetrafluoroethane (TFE-134) through the valve stem to a pressure of about 50 pounds per square inch (psi). The filled and pressurized aerosol cylindrical containers, parts A and part B, were affixed together in parallel with plastic snap-on fittings. The valve outlet of part A was attached to the valve outlet of part B using a Mixtek actuator, available from Mixtek Corporation (New York, N.Y.) as described in U.S. Pat. No. 6,877,924.

Example 2

A viscous blue, chemiluminescent aerosol spray formulation, having a viscosity of approximately 100 centipoise (cps), was prepared by combining 5.20 grams of bis(2-carbopentyloxy-3,5,6-trichlorophenyl)oxalate (CPPO) and 0.057 grams of 9,10-diphenylanthracene and 3.2 grams of polyhydroxystyrene into 80 grams of dibutylphthalate solvent. The mixture, designated as part A, was sonicated for 10 minutes to facilitate dissolution. The contents were decanted from the mixing vessel into a 30×160 mm aluminum aerosol cylinder, sealed with an aluminum mounting cup containing a butyl rubber gasket, a nylon tilt valve and a Teflon (PTFE) dip tube manufactured by Precision Valve Corporation (Yonkers, N.Y.). The sealed aerosol container and valve combination were injected with 6.5 grams of 1,1,1,2-tetrafluoroethane (TFE-134) through the valve stem to a pressure of about 50 pounds per square inch (psi). A separate mixture, designated part B was prepared by adding 2.80 grams of 35% hydrogen peroxide, 0.015 grams of sodium salicylate and 3.2 grams of polyhydroxystyrene to a mixture of 64 grams of dibutyl phthalate and 16 grams of tertiary butanol. The contents were decanted from the mixing vessel into a separate 30×160 mm aluminum aerosol cylinder, sealed with an aluminum mounting cup containing a butyl rubber gasket, a nylon tilt valve and a Teflon (PTFE) dip tube manufactured by Precision Valve Corporation (Yonkers, N.Y.) and injected with 6.5 grams of 1,1,1,2-tetrafluoroethane (TFE-134) through the valve stem to a pressure of about 50 pounds per square inch (psi). The filled and pressurized aerosol cylindrical containers, parts A and part B, were affixed together in parallel with plastic snap-on fittings. The valve outlet of part A was attached to the valve outlet of part B using a Mixtek actuator, available from Mixtek Corporation (New York, N.Y.) as described in U.S. Pat. No. 6,877,924.

Example 3

A yellow foam able resinous, chemiluminescent aerosol spray formulation was prepared by combining 5.20 grams of bis(2-carbopentyloxy-3,5,6-trichlorophenyl)oxalate (CPPO), 0.057 grams of 1-chloro-9,10-bis(phenyethynyl)anthracene and 9.60 grams of isobutyl methacrylate into 80 grams of dibutylphthalate solvent. The mixture, designated as part A, was sonicated for 10 minutes to facilitate dissolution. The contents were decanted from the mixing vessel into a separate 30×160 mm aluminum aerosol cylinder, sealed with an aluminum mounting cup containing a butyl rubber gasket, a nylon tilt valve and a Teflon (PTFE) dip tube manufactured by Precision Valve Corporation (Yonkers, N.Y.). The sealed aerosol container and valve combination were injected with 6.5 grams of dimethyl ether (DME) through the valve stem to a pressure of about 50 pounds per square inch (psi). In a separate vessel, the part B was prepared by adding 2.80 grams of 35% hydrogen peroxide, 0.015 grams of sodium salicylate and 9.6 grams of isobutyl methacrylate to a mixture of 64 grams of dibutyl phthalate and 16 grams of tertiary butanol. The contents of the part B mixture were decanted from the mixing vessel into a separate 30×160 mm aluminum aerosol cylinder, sealed with an aluminum mounting cup containing a butyl rubber gasket, a nylon tilt valve and a Teflon (PTFE) dip tube manufactured by Precision Valve Corporation (Yonkers, N.Y.) and injected with 6.5 grams of dimethyl ether (DME) through the valve stem to a pressure of about 50 pounds per square inch (psi). The filled and pressurized aerosol container part A and part B, were affixed together in parallel with plastic fittings and the valve of par A was attached to the valve of part B using a Mixtek actuator (available from Mixtek technologies) as described in U.S. Pat. No. 6,877,924.

Example 4

A reusable, yellow chemiluminescent aerosol spray marker formulation, with the catalyst in part A, was prepared by combining 5.42 grams of bis(2-carbopentyloxy-3,5,6-trichlorophenyl)oxalate (CPPO) and 0.059 grams of 1-chloro-9,10-bis(phenyethynyl)anthracene and 0.016 grams of sodium salicylate into 80 grams of dibutylphthalate solvent. The mixture, designated as part A, was sonicated for 10 minutes to facilitate dissolution. The contents were decanted from the mixing vessel into a separate 30×160 mm aluminum aerosol cylinder, sealed with an aluminum mounting cup containing a butyl rubber gasket, a nylon tilt valve and a Teflon (PTFE) dip tube manufactured by Precision Valve Corporation (Yonkers, N.Y.). The sealed aerosol container and valve combination were injected with 6.5 grams of 1,1,1,2-tetrafluoroethane (TFE-134) through the valve stem to a pressure of about 50 pounds per square inch (psi). In a separate vessel, part B was prepared by adding 2.91 grams of 35% hydrogen peroxide to a mixture of 64 grams of dibutyl phthalate and 16 grams of tertiary butanol. The contents of the part B mixture were decanted from the mixing vessel into a separate 30×160 mm aluminum aerosol cylinder, sealed with an aluminum mounting cup containing a butyl rubber gasket, a nylon tilt valve and a Teflon (PTFE) dip tube manufactured by Precision Valve Corporation (Yonkers, N.Y.) and injected with 6.5 grams of 1,1,1,2-tetrafluoroethane (TFE-134) through the valve stem to a pressure of about 50 pounds per square inch (psi). The filled and pressurized aerosol container part A and part B, were affixed together in parallel with plastic fittings and the valve of par A was attached to the valve of part B using a Mixtek actuator (available from Mixtek technologies) as described in U.S. Pat. No. 6,877,924.

Example 5

A reusable, bag on valve, blue aerosol spray chemiluminescent marker formulation was prepared by combining 5.42 grams of bis(2-carbopentyloxy-3,5,6-trichlorophenyl)oxalate (CPPO) and 0.059 grams of 9,10-diphenylanthracene into 80 grams of dibutylphthalate solvent. The mixture, designated as part A, was sonicated for 10 minutes to facilitate dissolution. The contents were decanted from the mixing vessel into a 30×160 mm aluminum aerosol cylinder, sealed with an aluminum bag on valve mounting cup containing a butyl rubber gasket, a nylon tilt valve and a Teflon (PTFE) dip tube manufactured by Precision Valve Corporation (Yonkers, N.Y.). The sealed aerosol container and valve combination were injected with 6.5 grams of 1,1,1,2-tetrafluoroethane (TFE-134) through the valve stem to a pressure of about 50 pounds per square inch (psi). A separate mixture, designated part B was prepared by adding 2.91 grams of 35% hydrogen peroxide and 0.016 grams of sodium salicylate to a mixture of 64 grams of dibutyl phthalate and 16 grams of tertiary butanol. The contents were decanted from the mixing vessel into a separate 30×160 mm aluminum aerosol cylinder, sealed with an aluminum bag on valve mounting cup containing a butyl rubber gasket, a nylon tilt valve and a Teflon (PTFE) dip tube manufactured by Precision Valve Corporation (Yonkers, N.Y.) and injected with 6.5 grams of 1,1,1,2-tetrafluoroethane (TFE-134) through the valve stem to a pressure of about 50 pounds per square inch (psi). The filled and pressurized aerosol cylindrical containers, parts A and part B, were affixed together in parallel with plastic snap-on fittings. The valve outlet of part A was attached to the valve outlet of part B using a Mixtek actuator, available from Mixtek Corporation (New York, N.Y.) as described in U.S. Pat. No. 6,877,924.

Example 6

A reusable, non-flammable, aerosol pump spray chemiluminescent marker formulation was prepared by combining 0.32 grams of sodium carbonate, 0.016 grams of 3-aminophthalhydrazide, 1.92 grams of sodium bicarbonate, 0.040 grams of ammonium carbonate monohydrate and 0.032 grams of copper sulfate pentahydrate to 78.4 grams of deionized water. The combined ingredients, designated as part A, were mixed for 10 minutes at room temperature and the contents were decanted from the mixing vessel into a 50 ml HDPE interlocking container manufactured by L'Oreal, Paris France and distributed by Versadial, New York, N.Y.). In a separate vessel, designated part B, 4 grams of 3% hydrogen peroxide were added to 76 grams of deionized water, mixed for 10 minutes and decanted into a second interlocking Versadial 50 ml HDPE container. To each container, a polypropylene dip tube, actuator valve, rubber seal, and volumetric pump were added and a sealed using a 42×40 mm dual dispensing and mixing volumetric pump as described in U.S. Pat. No. 7,222,752.

Example 7

A reusable, non-flammable, aerosol pump spray containing a viscous chemiluminescent marker formulation was prepared by combining 0.32 grams of sodium carbonate, 0.016 grams of 3-aminophthalhydrazide, 1.92 grams of sodium bicarbonate, 0.040 grams of ammonium carbonate monohydrate, 0.032 grams of copper sulfate pentahydrate and 2.0 grams of carboxymethylcellulose to 76.4 grams of deionized water. The combined ingredients, designated as part A, were mixed for 10 minutes at room temperature and the contents were decanted from the mixing vessel into a 50 ml HDPE interlocking container manufactured by L'Oreal, Paris France and distributed by Versadial, New York, N.Y.). In a separate vessel, designated part B, 4 grams of 3% hydrogen peroxide were added to 76 grams of deionized water, mixed for 10 minutes and decanted into a second interlocking Versadial 50 ml HDPE container. To each container, a polypropylene dip tube, actuator valve, rubber seal, and volumetric pump were added and a sealed using a 42×40 mm dual dispensing and mixing volumetric pump as described in U.S. Pat. No. 7,222,752.

Example 8

A reusable, green-yellow aerosol spray chemiluminescent paint formulation was prepared by combining 6.8 grams of bis(2-carbopentyloxy-3,5,6-trichlorophenyl)oxalate (CPPO) and 0.10 grams of 1-chloro-9,10-bis(phenylethynl)anthracene into 35 grams of acetyl tributyl citrate and 15 grams of benzyl benzoate and 5 grams of polyvinyl alcohol (molecular weight 170,000) and 2 grams of Rhopaque™ Ultra E Opaque Polymer. The mixture, designated as part A, was mixed for 30 minutes at 45 degrees Celsius to facilitate dissolution. The contents were decanted from the mixing vessel into a 4 ounce Seaquist/Aptar Fusion bag-on-valve (Crystal Lake, Ill.).

A separate mixture, designated part B was prepared by adding 5.5 grams of polyethylene glycol (molecular weight 200) and 3.5 grams of 50% hydrogen peroxide and 0.06 grams of tetrabutyl ammonium salicylate and 5 grams of polyvinyl alcohol (molecular weight 170,000) to a mixture of 39.4 grams of triethyl citrate. The mixture, designated as part B, was mixed for 30 minutes at 45 degrees Celsius to facilitate dissolution. The contents were decanted from the mixing vessel into a 7 ounce Sepro® barrier can. The Fusion bag-on-valve, filled with part A, was then placed into the Sepro® barrier can already containing the part B and sealed. The contents of the Sepro® barrier can was then pressurized to 120 pounds per square inch using nitrogen gas. Finally, a Eurostar actuator was placed on the valve stem.

Example 9

A reusable, green-yellow aerosol spray chemiluminescent paint formulation was prepared by combining 6.8 grams of bis(2-carbopentyloxy-3,5,6-trichlorophenyl)oxalate (CPPO) and 0.10 grams of 1-chloro-9,10-bis(phenylethynl)anthracene into 35 grams of acetyl tributyl citrate and 15 grams of benzyl benzoate and 5 grams of polyvinyl alcohol (molecular weight 170,000) and 2 grams of titanium dioxide. The mixture, designated as part A, was mixed for 30 minutes at 45 degrees Celsius to facilitate dissolution. The contents were decanted from the mixing vessel into a 4 ounce Seaquist/ Aptar Fusion bag-on-valve (Crystal Lake, Ill.). A separate mixture, designated part B was prepared by adding 5.5 grams of polyethylene glycol (molecular weight 200) and 3.5 grams of 50% hydrogen peroxide and 0.06 grams of tetrabutyl ammonium salicylate and 5 grams of polyvinyl alcohol (molecular weight 170,000) to a mixture of 39.4 grams of triethyl citrate. The mixture, designated as part B, was mixed for 30 minutes at 45 degrees Celsius to facilitate dissolution. The contents were decanted from the mixing vessel into a 7 ounce Sepro® barrier can. The Fusion bag-on-valve, filled with part A, was then placed into the Sepro® barrier can already containing the part B and sealed. The contents of the Sepro® barrier can was pressurized to 120 pounds per square inch using nitrogen gas. Finally, a Eurostar actuator was placed on the valve stem.

Example 10

A green-yellow chemiluminescent spray formulation was prepared by dissolving 6.8 grams of bis(2-carbopentyloxy-3, 5,6-trichlorophenyl)oxalate (CPPO), 0.1 grams of 1-chloro-9,10-bis(phenylethynyl)anthracene into 50.0 grams of acetyl tributyl citrate. The mixture, designated as part A, was mixed for 30 minutes at 45° C. to facilitate dissolution and then cooled to 20° C. A separate mixture, designated part B was prepared by adding 10.0 grams of polyethylene glycol (molecular weight 200), 3.5 grams of 50% hydrogen peroxide and 0.0375 grams of tetrabutyl ammonium salicylate to a mixture of 39.4 grams of triethyl citrate. The mixture, designated as part B, was mixed for 10 minutes at 20° C. to facilitate dissolution. A 53×143 mm aluminum can was filled to a pressure of 45 psi with compressed air and sealed with an aluminum cap affixed to a Lindal Bi-Power valve using a chlorobutyl valve gasket (FCA 7000). The entire contents of Part B were injected at a head pressure of 600 psi for 2.5 seconds, through the inner valve stem and into the inner bag to a pressure of 87 psi. The entire contents of Part A were injected through the outer valve stem and into the outer bag to produce a pressure of 100 psi. Finally, a Lindal dual-dispensing, single-stream actuator was placed on the valve stem.

Example 11

A viscous, white-opaque, yellow chemiluminescent, aerosol spray formulation was prepared by dissolving 6.8 grams of bis(2-carbopentyloxy-3,5,6-trichlorophenyl)oxalate (CPPO), 0.1 grams of 1,8-dichloro-9,10-bis(phenylethynyl) anthracene, 5.0 grams of polyvinyl alcohol (molecular weight 170,000) and 1.0 gram of Rhopaque® Ultra E into 44.0 grams of acetyl tributyl citrate. The mixture, designated as part A, was mixed for 30 minutes at 45° C. to facilitate dissolution and then cooled to 20° C. A separate mixture, designated part B was prepared by adding 10.0 grams of polyethylene glycol (molecular weight 200), 3.5 grams of 50% hydrogen peroxide and 0.02 grams of tetrabutyl ammonium salicylate to a mixture of 39.4 grams of triethyl citrate. The mixture, designated as part B, was mixed for 10 minutes at 20° C. to facilitate dissolution. A 53×143 mm aluminum can was filled identical to Example 10 and a Lindal dual-dispensing, single-stream actuator was placed on the valve stem.

What is claimed is:

1. A re-usable and multi-use chemiluminescent dispensing system comprising:
   a fixed container;
   at least two chambers within the fixed container, wherein a first chamber contains a first fluid comprising of a chemiluminescent fluorescer fluid, and wherein a second chamber contains a second fluid comprising of a chemiluminescent activator fluid;
   wherein the first chamber is a flexible chamber, wherein the second chamber is a flexible chamber;
   a quantity of a pressurized propellant, wherein the pressurized propellant is located within a space between the exterior of at least one of said flexible chamber and the interior of the fixed container;
   a pair of dip tubes, wherein one dip tube extends within the first flexible chamber, and wherein the other dip tube extends within the second flexible chamber;
   a valve assembly, wherein the valve assembly is connected to the pair of dip tubes; and
   a dispensing mechanism comprising an actuator, wherein upon depression of the actuator, the valve assembly allows for the release and interaction of the first fluid and the second fluid and ejection through an orifice in the actuator.

2. The re-usable and multi-use chemiluminescent dispensing system of claim 1, wherein one flexible chamber is disposed to be affixed within another flexible chamber.

3. The re-usable and multi-use chemiluminescent dispensing system of claim 1, wherein each of the first flexible chamber and the second flexible chamber is selected from the group consisting of: a bag, a vessel, pouch, tube and a bladder.

4. The re-usable and multi-use chemiluminescent dispensing system of claim 1, wherein the device is disposed to communicate chemiluminescent messages selected from the group consisting of: written text, numerics, alpha-numerics, figures, drawings, emergency messages, distress calls, trail markings, lanterns and directional traffic indicators.

5. The re-usable and multi-use chemiluminescent dispensing system of claim 1, wherein the quantity of propellant is sufficient to expel the first fluid and the second fluid to initiate the chemiluminescent reaction from the group consisting of: nitrogen, air, or inert hydrocarbons, such as; dimethoxymethane, ethyl acetone, acetone, dimethyl ether, 2-methoxyethanol, 2-ethoxyethanol, butanol, dimethyl ether, and 1,1,1,2-tetratfluoroethane.

6. The re-usable and multi-use chemiluminescent dispensing system of claim 1, wherein the chemiluminescent mixture further comprises a quantity of a polymeric resin selected from the group consisting of: polyhydroxystyrene, polyvinyl alcohol, and carboxymethylcellulose.

7. The re-usable and multi-use chemiluminescent dispensing system of claim 1, further comprising a plurality of inorganic light scattering compounds selected from the group consisting of: titanium dioxide, talc, barium sulfate and nanoparticulate barium titanate.

8. The re-usable and multi-use chemiluminescent dispensing system of claim 1, further comprising a plurality of organic light scattering compounds selected from the group consisting of: micron-sized polymeric spheres.

9. The re-usable and multi-use chemiluminescent dispensing system of claim 1, wherein the device is disposed to communicate chemiluminescent messages on dark or textured surfaces, such as grass dirt and trees.

10. A method of applying a plurality of chemiluminescent markings onto a surface using the system of claim 1, comprising the steps of:
   preparing a quantity of a fluorescent fluid by combining a fluorescent dye, an oxalate and a solvent;
   preparing a quantity of an activator fluid by combining hydrogen peroxide, a catalyst and a solvent;
   transferring the quantity of fluorescent fluid into a first flexible chamber;

sealing the first flexible chamber;
transferring the quantity of activator fluid into a second flexible chamber;
sealing the second flexible chamber;
transferring the quantity of propellant into the fixed chamber between one resilient chamber and another resilient chamber; and
dispensing the quantity of fluorescent fluid and the quantity of activator fluid simultaneously onto a surface.

11. The reusable and multi-use chemiluminescent system according to claim 1, wherein said at least two flexible chambers are sealed and pressurized to at least atmospheric pressure via pressurization of the fixed chamber and the dispensing mechanism simultaneously dispenses said fluorescer fluid and said activator fluid in a fine spray, initiating the chemiluminescent reaction and creating a chemiluminous mixture.

12. The reusable and multi-use chemiluminescent system according to claim 1, wherein said second fluid is made non-flammable and biodegradable by adding polyethylene glycol, having an average molecular weight of 200 thereto.

13. The reusable and multi-use chemiluminescent system according to claim 1, wherein said fluorescer fluid comprises of a fluorescer dye and an oxalate; and said activator fluid is comprised of a peroxide.

14. The reusable and multi-use chemiluminescent system according to claim 1, wherein said fluorescer fluid comprises of a fluorescer dye and an oxalate and said activator fluid is comprised of a peroxide and a catalyst.

15. The reusable and multi-use chemiluminescent system according to claim 1, wherein said fluorescer fluid comprises of an anthracene or napthacene dye, selected from the group consisting of 9,10-diphenylanthrancene, 9,10-bis(phenylethynyl)anthracene, 1-chloro-9,10-bis(phenylethynyl)anthracene, 5,6,11,12-tetraphenyl naphthacene, 5,12-bis(phenylethynyl) naphthacene, and rhodamine; an oxalate, comprised of bis(2-carbopentyloxy-3,5,6-trichlorophenyl) oxalate; and said activator fluid comprised of a peroxide, selected from the group consisting of hydrogen peroxide and urea hydrogen peroxide; and a catalyst, comprised of carboxylic acid salts or phenolic salts, selected from the group consisting of sodium salicylate, tetrabutylammonium salicylate, potassium salicylate, lithium salicylate, tetrahexylammonium salicylate, benzyltrimethylammonium m-chlorobenzoate, or dimagnesium ethylenediamine tetraacetate.

16. The reusable and multi-use chemiluminescent system according to claim 1, wherein said fluorescer fluid comprises of a combination of 9,10-diphenylanthracene and 1-chloro-9,10-bis(phenyethynyl)anthracene fluorescer dyes, which produces near-white light chemiluminescent emission.

17. The reusable and multi-use chemiluminescent system according to claim 1, wherein said fluorescer fluid comprises of 16,17-bis(decyloxy)violanthrone fluorescer dye, which produces infrared light emission, with peak of 790 nm.

* * * * *